Patented Aug. 25, 1925.

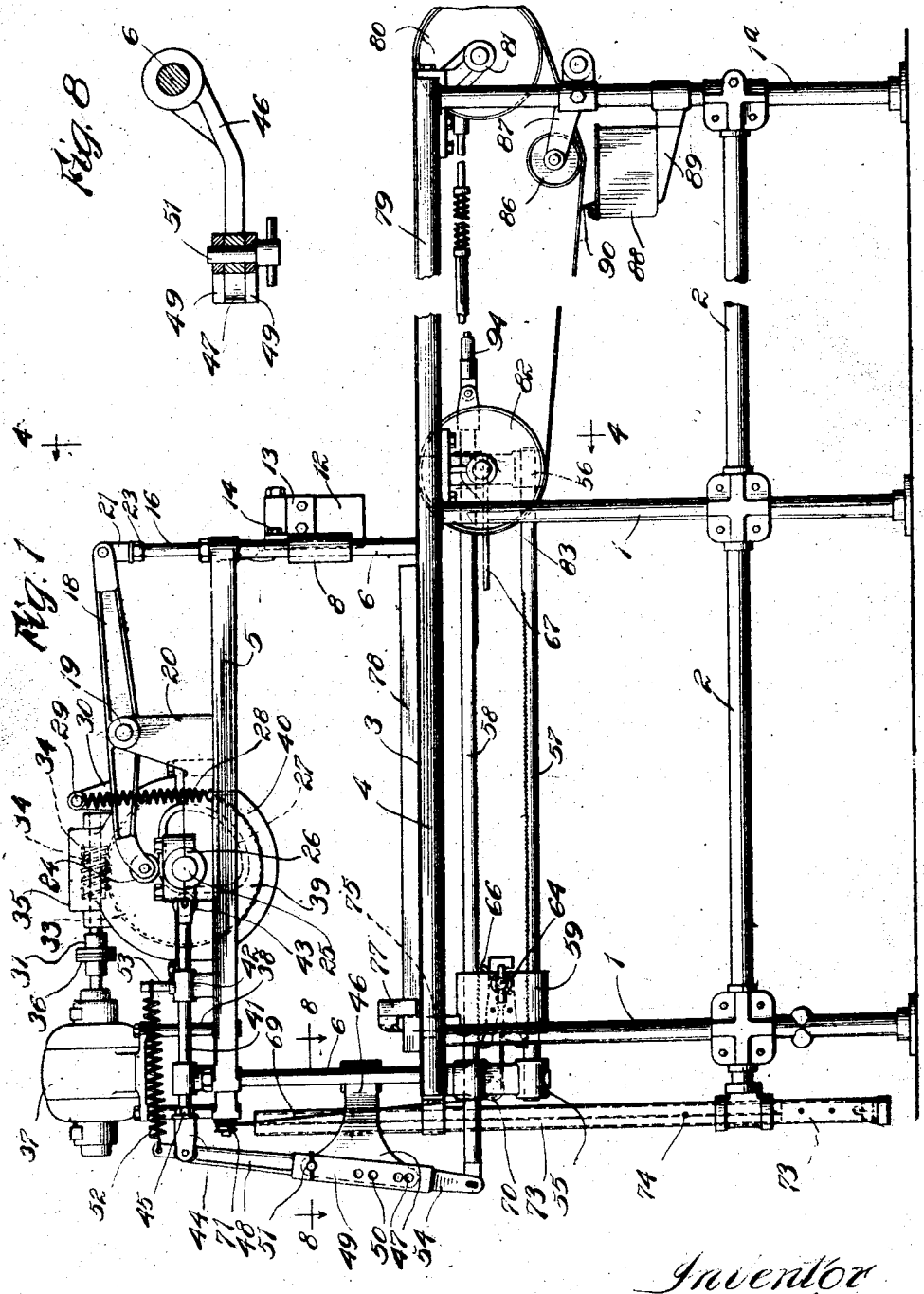

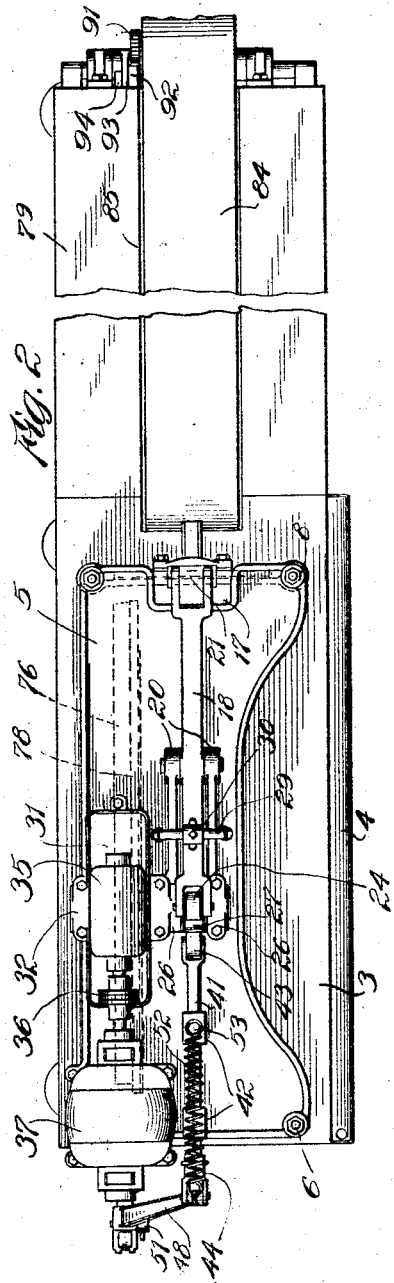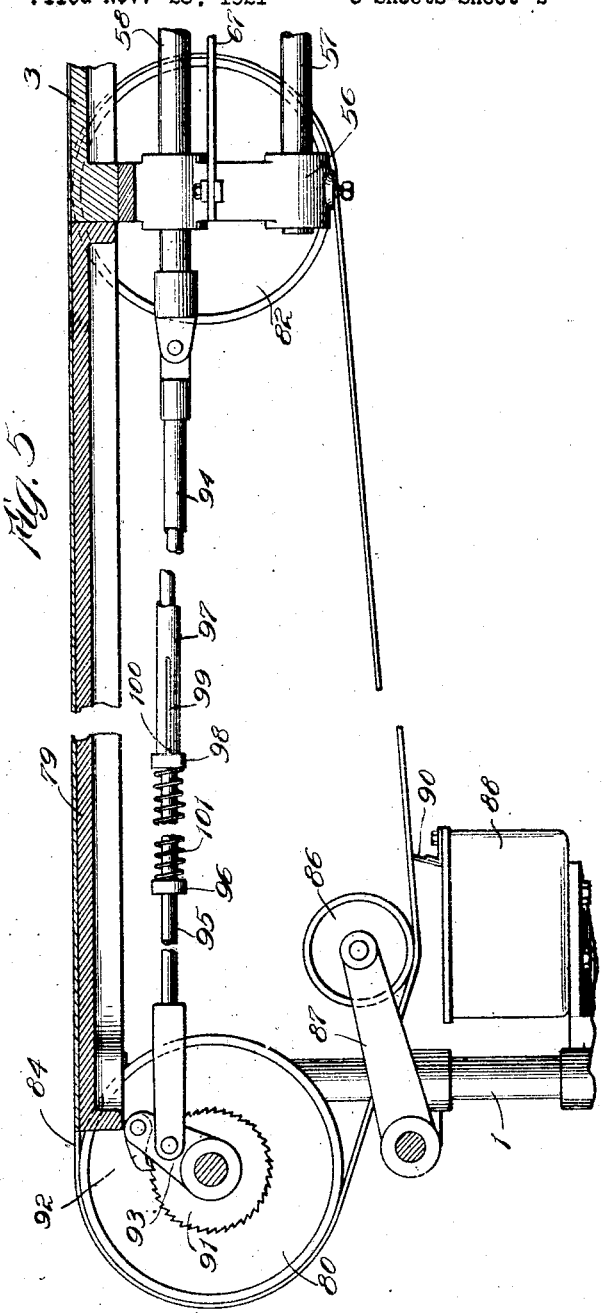

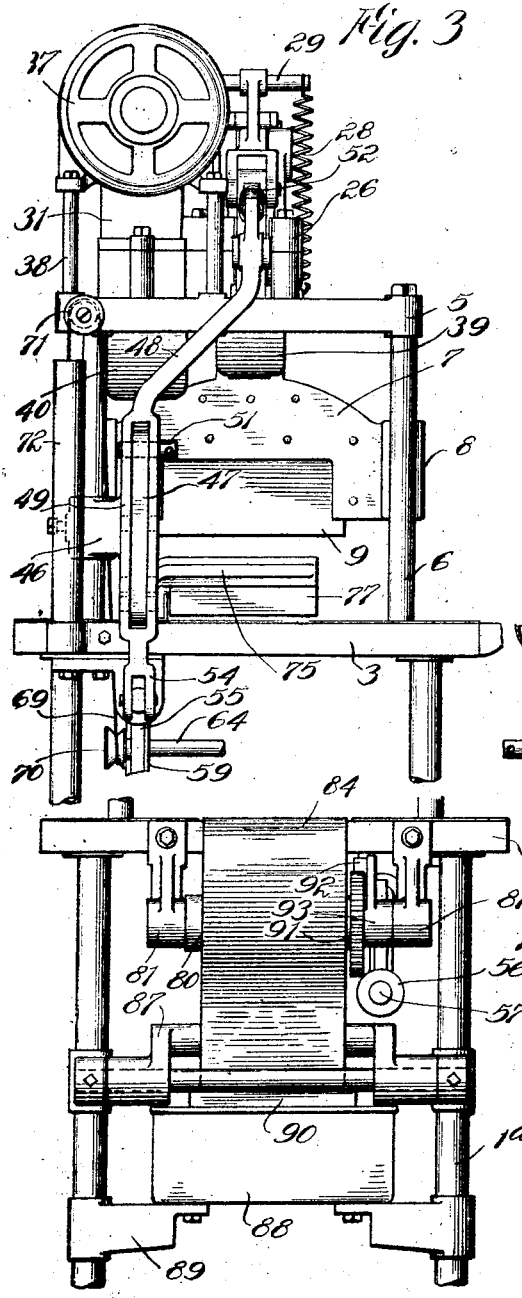

1,550,764

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ICE-CREAM-CUTTING MACHINE.

Application filed November 28, 1921. Serial No. 518,178.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Ice-Cream-Cutting Machines, of which the following is a specification.

The invention relates to machinery for cutting slabs of ice cream into various sizes of bricks and slices.

In the commercial manufacture of ice cream, the product often is marketed in packages suitable for delivery to the consumer and containing most frequently quart or pint quantities of ice cream, commonly known as bricks. As a further convenience to the consumer, the bricks may be cut into slices of suitable portion for individual service, the slices being separately wrapped and packed in cartons.

Ice cream which is intended to be sold in such form, is commonly finally frozen in elongated pans or molds of such dimensions that the contents of the molds may be cut into brick portions of the standard sizes without wastage. In machinery for cutting the hard frozen molded slabs of ice cream, automatic operation, durable sanitary construction and rapid dependable service are essential. It is highly desirable also that the machine be capable of ready adjustment for cutting bricks or slices of numerous sizes, and dispose of the severed portions conveniently for wrapping and packing them with sufficient dispatch to avoid melting of the ice cream.

One of the objects of this invention is to provide an automatic machine of this character which will quickly and accurately sever the ice cream portions in a variety of sizes of the severed pieces.

Another object is to provide in such a machine ready adjustment means for changing the size of the severed portions by a simple shift in position of a single element in the operating mechanism.

Another object is to incorporate provision in such a machine for carrying the severed pieces away from the cutting means in spaced relation convenient for wrapping by attendant operators, and for automatically varying the relative travel of the carrier proportionately to the size of the pieces.

A further object is to provide a machine in which the operating mechanism is of simple durable construction, readily accessible for adjustment and repair.

Other objects and advantages will be apparent in the following description of a preferred embodiment of my invention, which I have illustrated in the accompanying drawings.

It will be understood, however, that in the interpretation of the appended claims, they are not to be limited to the precise construction and arrangement set forth, as various modifications and variations may be made without departing from the spirit of the invention as set forth in the claims.

The embodiment of the invention selected for illustration herein, comprises generally a table on which the molded slab is placed, overhead reciprocating knives to sever portions from the slab, pushing means adapted to move the slab into position beneath the knives in successive steps adjustably gauged to give the desired sizes of severed pieces, conveying means controlled by the pushing means for receiving and removing the severed pieces for varying distances proportionate to the size of the pieces, and driving means which synchronizes the several operations and is readily adjustable to the variable operative requirements for cutting the different sizes of portions.

Referring to the accompanying drawings, Fig. 1 is a side elevation of the device, illustrated with a portion of the receiving table broken away.

Fig. 2 is a plain view similarly arranged.

Fig. 3 is an elevation of the front end (or left end in Fig. 1) of the machine with the lower frame supports broken away.

Fig. 4 is a sectional elevation taken on the plane of the line 4—4 in Fig. 1.

Fig. 5 is a sectional side elevation of the receiving means for the severed portions.

Fig. 6 is an end view of the latter.

Figs. 7 and 8 are detail views of the parts of the operating mechanism.

In the drawings the numeral 1 indicates frame uprights, braced by cross members 2, and carrying a table 3, the latter being adapted to receive the slabs of molded ice cream to be cut. Any small accumulation of melted ice cream on the table may be drained or removed into a trough 4 suitably secured along the side of the table.

Positioned a substantial distance above the cutting table is a plate 5 mounted upon vertical corner posts 6 secured in the table. Driving mechanism for actuating the machine is mounted upon the plate 5, the latter having upturned peripheral edges to form a pan preventing the possible drip of lubricating oil upon the table.

The open elevated position of the driving mechanism gives convenient access to its parts and removes it from the possible drip of melted ice cream as when located beneath the cutting table.

The rear pair of posts 6 serve as guiding supports for a vertically reciprocating cross head 7 having bearings 8 slidably embracing the respective posts. A cutting knife 9 is fastened upon the cross head by means of a clamp 10 secured to the head by cap screws 11. The knife is arranged to cut on the down stroke of the cross head, the latter being centrally arched to give clearance for the severed sections of the ice cream slab.

The knife 9 cuts transverse sections of the slab as the latter is moved longitudinally over the table by means later described. The transverse sections may be simultaneously cut longitudinally of the slab by a second knife 12 extending at right angles to the knife 10 and clamped in a split bracket 13 secured to the cross head as by cap screws 14.

The top of the cross head carries a pair of spaced lugs 15 between which is pivoted a connecting rod 16, extending upwardly through a recess 17 in the end of the plate 5, and operatively connected at its upper end to a lever 18 centrally pivoted at 19, between a pair of bearing supports 20 rising from the plate 5.

The connecting rod 16 may be sectionally constructed for adjustment of the lowermost position of the knife in relation to the table 3. As illustrated herein, the connecting rod is right and left threaded respectively into its end bearing members 21 and 22, and secured in position by lock nuts 23.

The opposite end of the lever 18 carries a roller 24 pivoted in the yoked extremity of the lever. A shaft 25, journaled in bearings 26 rising from the plate 5, carries a cam 27 in operative contact with the roller 24, thereby operatively effecting the reciprocation of the knife carrying cross head 8 upon rotation of the shaft 25. The upward movement of the cross head and the continuous operative contact between the roller and the cam may be accomplished by means of a pair of spiral springs 28, secured at one end by suitable fastenings to the plate 5, their upper ends being attached to a cross pin 29, carried by a bracket 30 formed on the lever 18. The springs are tensioned to draw the roller end of the lever 18 downward upon the cam.

The shaft 25 and its operating cam member 27, are driven by a conventional worm gear mechanism operating within a housing 31. The shaft 25 extends through and is suitably journaled in the sides of the housing as at 32. A spiral toothed gear 33 is mounted on the shaft 25 within the housing, and is in driven engagement with a worm 34 journaled in the upper portion 35 of the housing. One end of the worm shaft extends outwardly of the housing for operative connection, as by a coupling 36, with the armature shaft of an electric motor 37. Supporting posts 38, fixed in the plate 5, carry the frame of the motor in suitable position for the alinement of the motor and worm shafts.

Depressions 39 and 40 in the plate 5 are arranged to accommodate the lower swing of the cam 27 and gear 33 respectively.

The cam 27 is also the actuator for the mechanism provided for forwarding the slab of ice cream upon the table 3 in successive regulated steps toward the cutting knife.

The forwarding mechanism comprises a reciprocating rod 41 positioned in the operating plane of the cam 27 and slidably supported in bearings 42 carried by the plate 5. The bifurcated end of the rod 41 adjacent the cam carries a pivoted roller 43 in operative contact with the cam. Upon the opposite end of the rod 41 a yoke member 44 may be adjustably threaded and secured by a lock nut 45.

A bracket 46, rigidly secured to one of the vertical corner posts 6, extends outwardly from the table and terminates in a vertically enlarged portion 47 upon which is pivotally supported an arm 48. The latter is formed with a longitudinally slotted central portion 49 embracing the portion 47 of the bracket, the engaging portions of the arm and bracket being provided with a registering series of holes 50 to receive a pivot pin 51 adapted to be selectively positioned in either of the holes, thereby changing the pivot center or fulcrum of the swinging arm.

The upper portion of the arm 48 is pivotally connected, adjacent its end, in the yoke 44 carried by the reciprocating rod 41. To the upper extremity of the arms is attached a coiled spring 52 having its other end stationarily secured as to a post 53 rising from one of the bearing standards 42. The spring 52 is tensioned to draw the arm and reciprocating rod inwardly and maintain the roller 43 in contact with the cam 27. The lower end of the arm 48 preferably terminates in a yoke 54 positioned below the plane of the table 3.

A pair of depending brackets 55 and 56 fixed on the underside of the opposite ends of the table are provided each with a pair of vertically spaced parallel bearings alined with those of the opposite bracket. In the lower bearings of the two brackets is stationarily secured a bar 57, having closely arranged ratchet teeth cut in its upper surface. In the upper bearings of the brackets a longitudinally slidable bar 58 is operatively supported, having similar ratchet teeth cut on its under surface. The forward end of the bar 58, extends outwardly from the table and is pivotally connected within the yoke 54 of the arm 48.

A sliding carriage 59 is operatively mounted on the two bars with sliding bearings upon each of them. A chamber 60 (see Fig. 7) is preferably formed in the carriage 59 between the two bearings, in which is pivoted a pair of dogs 61 and 62 respectively adapted to engage the ratchet teeth of the upper and lower bars. The dog 61 may be provided with a counter weight 63 tending to swing the opposite end of the pivoted dog into engagement with the bar 58, and the engaging end of the dog 62 may be sufficiently weighted to normally rest upon the bar 57.

A release rod 64, operatively supported in the carriage 59 and extending laterally to a manually accessible position under the edge of the table, passes through the chamber 60 between the spaced free ends of the pivoted dogs, and carries therein a transversely fixed pin 65. By rotating the release rod, the pin 65 may be swung into upright position between the dogs, thereby separating their free ends sufficiently to disengage both dogs from their respective ratchet bars and permitting the carriage to run free thereon.

The rearward end of the release rod 64 is provided with a cross pin 66 adapted to be engaged, when the carriage reaches the limit of its forward movement, by a trip bar 67 secured as at 68 upon the bracket 56, and thereby rotate the rod and release the dogs to automatically release and permit the return movement of the carriage.

To effect the return of the carriage when released to the position illustrated in the drawings, a flexible cable 69 attached to the carriage 59 passes around a sheave 70 mounted on the bracket 55, upwardly and over a second sheave 71 mounted on the end of the table 5, and thence downwardly into an elongated cylinder 72, terminating in attachment to a weight 73 vertically slidable in the cylinder and acting therein as a piston. A series of holes 74 spaced longitudinally in the wall of the cylinder serves to permit gradual escape of the air entrapped in the closed lower end of the cylinder by the descent of the weight, and retard the dropping weight sufficiently to prevent damage to the carriage from jamming its stop at the end of its return movement.

Extending upwardly from the carriage 59 is a fixed arm 75, passing through an elongated slot 76 in the table 3, and bent transversely over the table top to support a forwarder or pusher plate 77 secured thereto as by screws. A guide rail 78 may be secured to the table adjacent the pusher plate to aid in directing the slab of ice cream squarely to the cutting knife.

It will now be apparent that the cutting knife and the slab forwarder are operated in synchronous alternation with the actuation of the lever 18 and the bar 41 by the cam 27, so that the slab is advanced on the table while the knife pauses in upper position, and remains at rest while the knife makes its cutting stroke.

In the operation of the machine, a slab of ice cream is removed from its mold or freezing pan and placed upon the table in lateral contact with the guide rail 78 and abutting the pusher plate 77 positioned as illustrated. With the inward movement of the bar 58, the carriage 59 carrying the pusher plate is advanced with the bar for the distance of its inward stroke by means of the engagement of the dog 61 with the ratchet teeth on the under side of the bar, the dog 52 meanwhile passing over the teeth of the stationary bar 57.

The carriage is prevented from over-running the stroke of the reciprocating bar by the weighted cable 69 which resists the forward movement of the carriage and holds the dogs in firm engagement with their respective bars. With the reverse movement of the bar 58, the dog 62 engages the teeth of the stationary bar and holds the carriage at rest.

The provision for shifting the pivot center of the arm 48 permits selective variation in the distance by which the ice cream slab is advanced with each movement of the forwarder, thereby enabling the cutting of portions of various thicknesses from the slab. With the arm 48 in normal position as illustrated, all of the holes 50 are in register with the corresponding holes in the bracket 47, and the pin 51 may be inserted through either of them. As the range of movement of the rod 41 is constant, it will be obvious that the range of movement of the lower end of the arm 48 will be increased or decreased by positioning the pin 51 in the upper or lower pivot holes respectively.

The number and relative location of the holes may be calculated to give any desired combination of distances within the extreme limits by which the carriage and slab pusher may be advanced, thus giving any desired thickness of slices to be cut from the slab.

To change the size of the portions cut from the slabs, it is necessary only to withdraw the pin 51 from the one hole and insert it in another of the registering holes, whereupon the machine is completely adjusted and ready for further operation.

In order to facilitate the wrapping and packing of the cut portions of ice cream, the machine may be further arranged to remove and separate the severed slices conveniently for those operations. In the embodiment herein illustrated, I have provided a rearward extension 79 of the table 3, outwardly supported upon the frame uprights 1ª.

The outer end of the table extension carries a roller 80 journaled in brackets 81, suitably secured to the table, the roller being centrally located at the end of the table, and having its upper surface at the approximate level of the table top. Another roller 82 is located in an opening in the table top immediately forward of the position of the cutting knives, with its upper surface also approximately level with the table top, and journaled in brackets 56 and 83 secured to the under side of the table.

An endless belt 84 operatively supported on the two rollers is arranged with its upper run flatly disposed on the extension portion of the table. If desired, a shallow channel 85 of the width of the belt may be formed in the table top to receive the belt with its upper surface flush with the table top.

The lower run of the belt may support a tensioning idler roll 86, journaled in a swinging bracket 87 pivotally supported on the frame member 1ª.

A receptacle 88 may be mounted on brackets 89 secured to the post 1ª, and carry a squeegee 90 positioned to remove any liquid accumulation on the belt and drain it into the receptacle.

The belt 84 is intermittently actuated by a pawl and ratchet mechanism. The roller 80 has rigidly associated therewith a ratchet wheel 91, with which cooperates a pawl 92 pivoted on an oscillating arm 93 mounted on the roller shaft. The reciprocating ratchet bar 58 is extended through its bearing in the bracket 56, and is operatively connected at its end with a link 94, the latter being pivotally connected at its opposite end to the arm 93. The movement of the bar 58 is transmitted through the link 94 to the pawl 92, which operatively engages the ratchet wheel 91 in its forward movement and intermittently rotates the roller 80 carrying the belt 84.

To minimize strain upon the operating parts, the link 94 may be of telescopic construction comprising an inner rod 95 carrying a collar 96, and an outer tubular section 97 also carrying a collar 98 and slotted as at 99 to accommodate a retaining pin 100 secured on the inner rod. A compression spring 101 positioned between the respective collars permits the sections to telescope under strain and avoid damage.

The driving connection between the bar 58 and the roller 80 is arranged so that the peripheral speed of the roller and of the belt is materially greater than the simultaneous movement of the slab of ice cream on the table. In consequence, as the severed pieces are pushed forward onto the belt, the latter moves them forward a considerable space in advance of the following pieces which are deposited on the belt with the succeeding advances of the slab.

Obviously the necessary distance of movement of the belt varies with the thickness of the cut portions. The required adjustment of the belt actuating mechanism is automatically accomplished with the adjustment of the slab forwarding mechanism in that the movement of the pawl 92 is directly proportionate to the movement of the bar 58, thereby providing for the desired spacing of the severed pieces of whatever thickness the latter may be.

As the pieces are carried forward on the belt, operators stationed at the sides of the table extension 79 may remove them, and wrap and pack them on the side portions of the table.

It will now be apparent that I have provided an ice cream cutting machine of simple durable construction, capable of effective accomplishment of the purposes set forth herein.

I claim as my invention:

1. An ice cream cutting machine comprising a table adapted to support a mass of frozen ice cream, means for intermittently forwarding said mass of cream across said table for variable distances, means for intermittently severing portions of said cream of variable dimensions, and intermittently operable conveyor means adapted to receive said severed portions and carry them from said severing means for variable distances proportionate to the movement of said forwarding means, said forwarding means and said conveying means being actuated in common by an adjustably reciprocatory sliding member.

2. An ice cream cutting machine comprising a table, intermittent severing means associated with said table, means for intermittently pushing a mass of frozen ice cream across said table into operable relation with said severing means, a conveyor belt adapted to receive the severed portions, and common actuating means for intermittently and simultaneously advancing said conveyor belt and said pushing means, including a sliding bar having an adjustable range of reciprocatory movement.

3. In an ice cream cutting machine, a table, a cutting knife, means for pushing material into position to be operated upon by said cutting knife, and means for actuating said pushing means over variable distances including a lever having a fulcrum capable of being variably positioned, and a reciprocatory bar operable by said lever.

4. In an ice cream cutting machine, a table, a cutting knife, means for pushing material into position for the severance of portions thereof by said cutting knife, conveying means for removing said severed portions, and means for simultaneously actuating said pushing and conveying means including a reciprocatory bar for actuating said pushing and conveying means and a lever having a movable fulcrum to control the extent of movement of said bar.

5. In an ice cream cutting machine, a reciprocatory severing device, a slidable forwarder for intermittently feeding a slab of ice cream into the path of movement of said severing device, and mechanism for alternately actuating said severing device and said forwarder, said mechanism including a lever operatively connected with said forwarder having a series of selective fulcrum bearings and a stationary support therefor having a selectively positioned pivot member whereby the feeding movement of said forwarder may be varied in extent.

6. In an ice cream cutting machine, means for pushing a slab of ice cream by variable progressive steps comprising a forwarder, a lever operatively connected to said forwarder and having a series of selective fulcrum bearings, a stationary support having a similar series of selective bearings normally in register with the bearings in said lever, and a pivot member adapted to be interchangeably positioned in either registering pair of said bearings.

7. In an ice cream cutting machine, a slidably supported forwarder, a pair of dogs carried by said forwarder, a stationary ratchet element arranged to be engaged by one of said dogs, a reciprocatory ratchet element arranged to be engaged by the other of said dogs, a conveyor having an actuating roller, a rotary ratchet element on said roller, and a dog operatively connected to said reciprocatory ratchet element arranged to engage said rotary ratchet element.

8. In an ice cream cutting machine, a reciprocatory cutting knife, a slidably mounted forwarder for pushing a slab of ice cream into the path of said cutting knife, releasable means for progressively advancing said forwarder, and cushioned means for returning said forwarder when released to initial position comprising an upright tube having a closed lower end and a series of lateral perforations, a piston-like weight operable in said tube, and a connection between said weight and said forwarder whereby said weight rises with the advancement of said forwarder and falls with the release of said forwarder.

9. In an ice cream cutting machine, a reciprocatory cutting knife, a lever arranged to actuate said knife, a slidable forwarder, a reciprocatary bar to advance said forwarder, a second lever having an adjustably positioned fulcrum with its variably movable end operatively connected to said bar, a push rod operatively connected to the other end of said lever, and a single rotatable cam operatively engaging said first mentioned lever and said push rod to alternately actuate said cutting knife and said forwarder.

In testimony whereof I have hereunto set my hand.

THEODORE L. VALERIUS.